(12) United States Patent
Castillo (10) Patent No.: US 6,902,385 B2
(45) Date of Patent: Jun. 7, 2005

(54) BLOWN-FILM EXTRUSION DIE (76) Inventor: Rafael José Castillo, 2 Sheridan Lane, Hamilton, Ontario (CA), L8S 2N4

(*) Notice: Subject to any disclaimer, the term of this patent is extended or adjusted under 35 U.S.C. 154(b) by 363 days.

(21) Appl. No.: 10/060,081

(22) Filed: Jan. 31, 2002

(65) Prior Publication Data
US 2002/0114858 A1 Aug. 22, 2002

Related U.S. Application Data

(63) Continuation-in-part of application No. 09/514,359, filed on Feb. 28, 2000, now Pat. No. 6,343,919.

(51) Int. Cl.[7] .............................................. B29C 47/26
(52) U.S. Cl. .............................. 425/133.1; 425/192 R; 425/380; 425/462
(58) Field of Search .............................. 425/133.1, 380, 425/192 R, 462

(56) References Cited

U.S. PATENT DOCUMENTS

| 3,475,789 | A | * | 11/1969 | Stroup et al. | ................ 425/462 |
| 3,809,515 | A | * | 5/1974 | Farrell | ..................... 425/133.1 |
| 4,182,603 | A | * | 1/1980 | Knittel | ..................... 425/133.1 |
| 5,393,216 | A | * | 2/1995 | Teutsch et al. | .......... 425/133.1 |
| 5,538,411 | A | * | 7/1996 | Gates | ...................... 425/133.1 |
| 5,716,650 | A | * | 2/1998 | Mavridis | .................. 425/131.1 |
| 6,116,885 | A | * | 9/2000 | Planeta et al. | ........... 425/133.1 |
| 6,343,919 | B1 | * | 2/2002 | Rodriguez et al. | ....... 425/133.1 |
| 6,471,502 | B2 | * | 10/2002 | Cree | ...................... 425/133.1 |
| 6,638,463 | B2 | * | 10/2003 | Davidson et al. | ........ 425/133.1 |

FOREIGN PATENT DOCUMENTS

DE           4218095 A1 * 12/1993    ........... B29C/47/20

* cited by examiner

Primary Examiner—Robert B. Davis (57) ABSTRACT

A melt distribution block for feeding melt through an extrusion die to an extrusion passage. The melt distribution block has a generally annular body with inner, outer, front and rear faces. The front and rear faces include a series of flow divider channels therein extending generally radially inwardly from an inlet and terminating in a plurality of feed spirals. The feed spirals curve radially inwardly from the flow divider channels to encircle the inner face and narrow toward a radially inwardly disposed end. The feed spirals on the front and rear spaces curve in respectively opposite directions. An inlet port extends into the outer face and fluidly communicates with the inlet of the flow divider channels. A melt distribution die includes an axially stacked array of melt distribution blocks interspersed with separator blocks extending radially about a centrally disposed mandrel to define an extrusion and passage therebetween.

19 Claims, 10 Drawing Sheets

BLOWN-FILM EXTRUSION DIE

This is a Continuation-in-Part of patent application Ser. No. 09/514,359, filed 28 Feb. 2000, granted 5 Feb. 2002, as U.S. Pat. No. 6,343,919.

FIELD OF THE INVENTION

This invention relates to co-extrusion dies for extruding multilayer polymer materials into a single tubular form.

BACKGROUND OF THE INVENTION

Many areas of polymer processing require multiple layers of different polymers to be co-extruded into a single tubular form. One example is the blown film process which is used to make most of today's commodity bags and also high barrier food packaging. Although multi-layer packaging can be made from co-extruded flat film, using a tubular form presents fewer sealing operations, results in less trim scrap and is more conducive to certain product shapes.

Tubular forms are used in many applications including the production of multi-layer pipe or tubing, pipe coating, wire coating, and the production of multi-layer parisons for blow molding. Tubular parisons are used in making containers of various shapes as annular dies are typically easier to manufacture than dies of other shapes, such as oval or square. Annular co-extrusion dies are commonly used to process high volume commodity resins as well as relatively low volumes of barrier type resins.

Annular co-extrusion dies are generally of one of two arrangements; namely axially fed and radially fed. In either type of arrangement, melt is introduced into an inlet port from where it has to be evenly distributed about the circumference of an annular outlet. Good flow distribution is essential to forming film having layers which are uniform in thickness, appearance and structural integrity. In axially fed co-extrusion dies, melt is fed in a direction parallel to the axis of the tubular form to be extruded. Each layer is formed between respective die elements which are generally concentrically disposed in a manner analogous to cups of different diameter stacked one within an other. The individual layers are merged upstream in an extrusion passage through which the co-extruded film is discharged.

In radially fed co-extrusion dies, melt distribution blocks are stacked one behind another along a die axis and melt is fed radially relative to the die axis into a respective inlet port in each melt distribution block. The melt distribution blocks distribute the melt about a central mandrel and discharge the melt in an axial direction into an extrusion passage between the melt distribution blocks and the mandrel. Each consecutive melt distribution block applies an overlying melt layer to the melt moving along the extrusion passage.

Axially stacked radially fed co-extrusion dies are advantageous in that it is relatively simple to vary the number of layers by varying the number of "modules" stacked along the die. Furthermore, each level presents a similar area and the levels are more easily thermally isolated than possible with axially fed co-extrusion dies in which heat from one die element is difficult to isolate from adjacent die elements. Even melt distribution is however a much more challenging problem with radially fed co-extrusion dies because of a much shorter axial distance being available for melt equalization and the requirement to redirect melt flow from a radial to an axial direction after the melt has been distributed into a thin film.

It is an object of the present invention to provide a radially fed multilayer extrusion die which is effective in providing a uniformly thick film of melt to an extrusion passage.

It is a further object of the present invention to provide a melt distribution block for a radially fed multilayer extrusion die which can accept and combine two different types of melt.

It is yet a further object of the present invention to provide a melt distribution block for an extrusion die having a matched pair of distribution passages so configured and oriented as to cause an averaging of extruded film thickness by matching high flow areas of one of said pair of passages with lower flow areas of the other of said pair of passages.

SUMMARY OF THE INVENTION

A melt distribution block for feeding melt through an extrusion die to an extrusion passage. The melt distribution block has a generally annular body with an inner face extending about the extrusion passage, an outer face radially outward of the inner face and opposite front and rear faces. The front and rear faces each have a series of flow divider channels thereon which extend in a generally radially inward direction from an inlet through a series of flow diverting bifurcations which terminate in a plurality of feed spirals. Each of the feed spirals substantially encircles the inner face and narrows toward a radially inwardly disposed end. The feed spirals on the front and rear faces curve in respectively opposite directions. An inlet port extends into the outer face to fluidly communicate with the inlet of the flow divider channels.

A melt distribution die has an axially stacked array of melt distribution blocks of the type described above interspersed with separator blocks extending radially about a centrally disposed mandrel. An extrusion passage is defined between the mandrel and the stacked array of melt distribution and separator blocks. The separator blocks cover the flow divider channels to maintain melt flow within the flow divider channels. The separator blocks are spaced apart from the feed spirals to define a generally continuous melt outlet passage extending into the extrusion passage.

In order to thermally isolate adjacent feed spirals, the separator blocks may be provided with a radially extending insulating zone generally corresponding in location to the feed spirals.

DESCRIPTION OF DRAWINGS

Preferred embodiments of the invention are described below with reference to the accompanying drawings in which.

DESCRIPTION OF PREFERRED EMBODIMENTS

A melt distribution block according to the present invention is generally indicated by reference 10 in the accompanying illustrations. The melt distribution block has a generally annular body 12 with an inner face 14 which, in use, extends about and defines part of an outer surface an extrusion passage 16 in FIGS. 6 and 7. The melt distribution block 10 has an outer face 18 radially outward of the inner face 14, a front face 20 in FIG. 1 and a rear face 22 in FIG. 2, opposite the front face 20.

Figure 1:
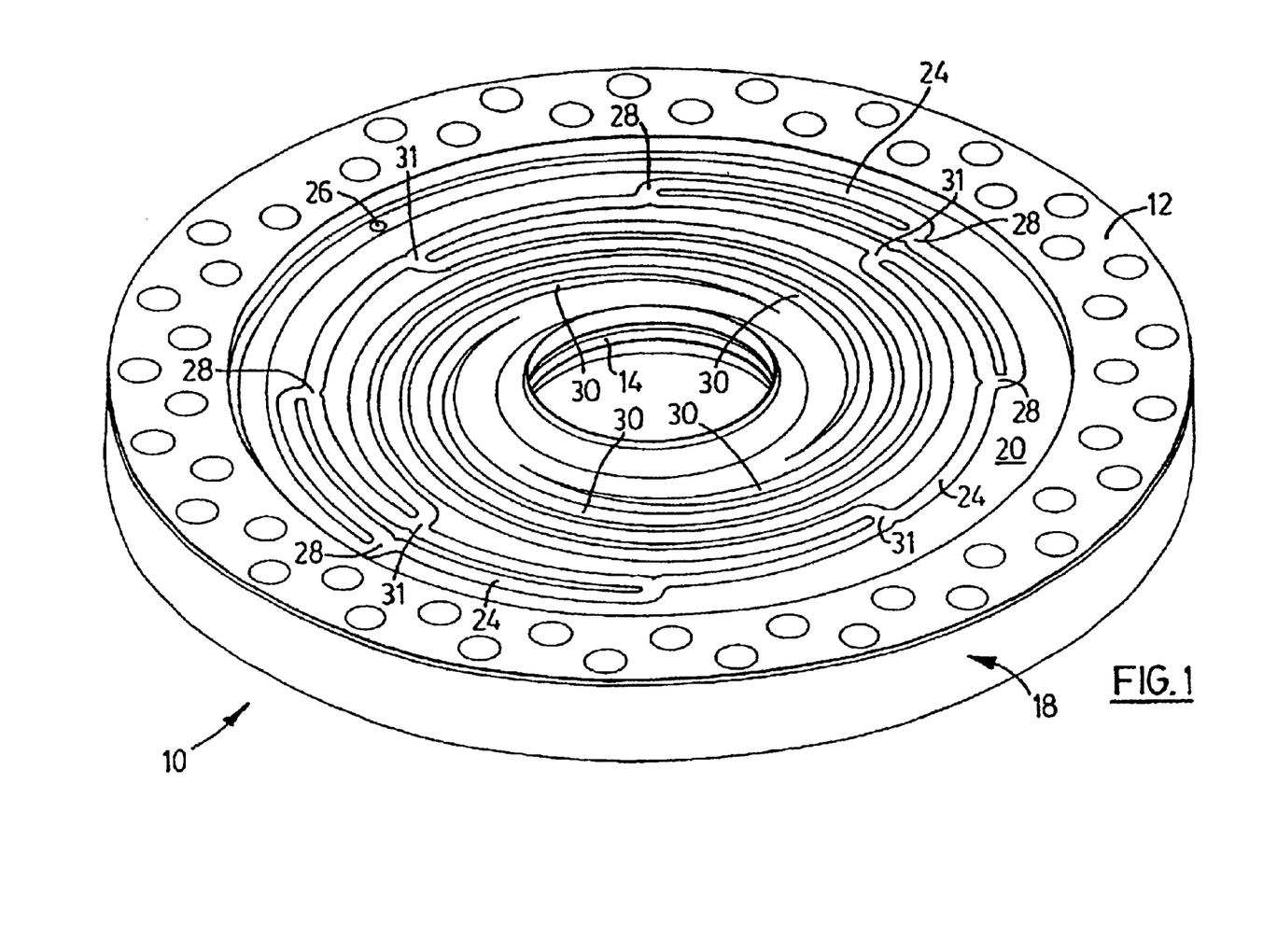
FIG. 1 is a perspective view of a melt distribution block according to the present invention.
Figure 2:
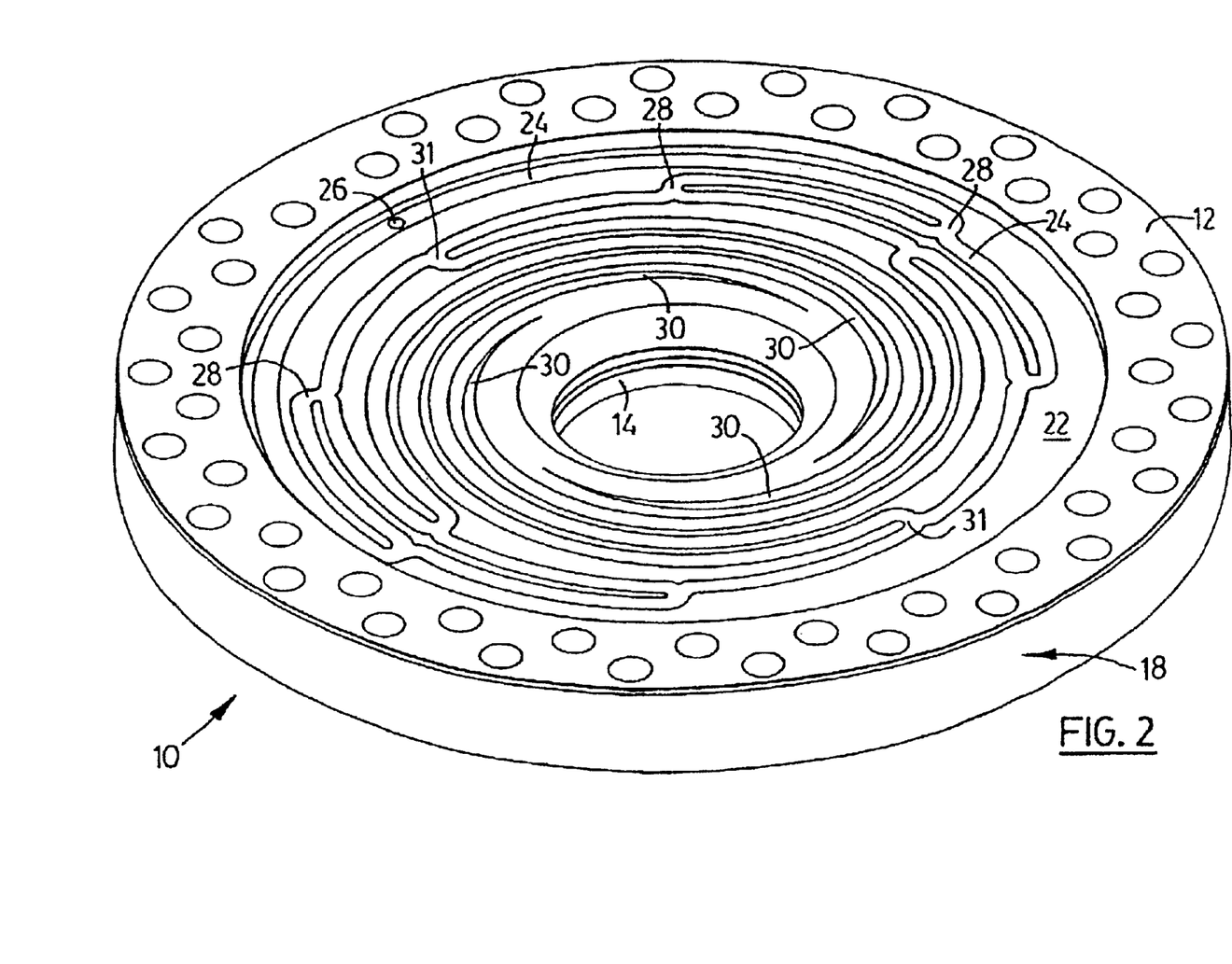
FIG. 2 is a perspective view corresponding to FIG. 1 but showing an opposite face of a melt distribution block according to the present invention.

The front and rear faces, 20 and 22 respectively have a series of flow divider channels 24 extending into their surfaces. The flow divider channels 24 are generally concentrically disposed and define a flow path which extends in a generally radially inward direction from an inlet 26 through a series of flow dividing bifurcations 28.

Each of the flow dividing bifurcations 28 is located at a juncture of the end of a flow dividing channel 24 and the midpoint of an adjacent, radially inwardly disposed flow dividing channel 24. The direction of melt flow is initially from an inlet 26 into the outermost flow divider channel 24 and then through the flow dividing bifurcations 28 into adjacent radially inwardly disposed flow dividing channels 28. Upon passing through each flow dividing bifurcation 28, which are in effect "T" junctions, melt flow is divided into two generally oppositely directed melt flow paths of similar configuration and therefore similar flow rate.

The flow dividing channels 24 distribute melt from the inlet 26 evenly about the mold block 10 which is important as a first step in ensuring uniformity of flow from the mold block 10 into the extrusion passage 16 about its circumference.

The flow dividing channels 28 terminate in four feed spirals 30 which are radially inward of the flow dividing channels 28. Although four feed spirals 30 are illustrated, other numbers may be selected as being more desirable in some applications, keeping in mind however that the number of flow dividing channels 28 would have to be selected accordingly.

Each feed spiral 30 is "fed" by (ie., fluidly communicates with) two of the flow divider channels 24 at references 31 to obtain as consistent as possible a flow of melt into each of the feed spirals 30 by "averaging" the melt flow between adjacent flow divider channels 28.

Each feed spiral 30 substantially encircles the inner face 14 in a loop of diminishing radius and breadth. The feed spirals 30 are basically channels of diminishing width and breadth, the purpose of which is to evenly spread melt over a thin, even layer before it enters the extrusion passage 16. Using a plurality of circumferentially spaced apart feed spirals 30 evens out the flow from each feed spiral. To further even out high and low flow areas, the front and rear faces 20 and 22 have respective feed spirals 30 which curve in opposite directions relative to each other as viewed through the melt distribution block 10.

It should be noted that although the feed spirals 30 in FIGS. 1 and 2 appear to curve in a clockwise direction, FIGS. 1 and 2 depict faces of a melt distribution block 10 which would face away from each other. Accordingly, if either of FIGS. 1 and 2 is flipped over and viewed against a light, it will become apparent that the curve of the feed spirals 30 when viewed "through" the melt distribution block 10 is reversed from that when viewed on its face. A similar reversal should be notionally taken into account in considering the plan views of FIGS. 3 and 4.

Figure 3:
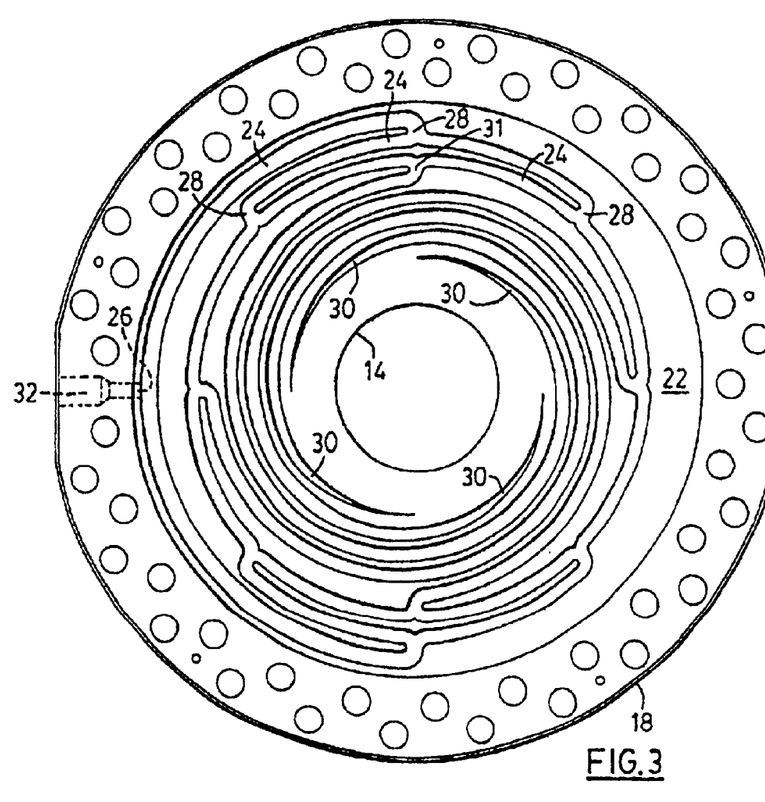
FIG. 3 is a top plan view of a melt distribution block according to the present invention.
Figure 4:
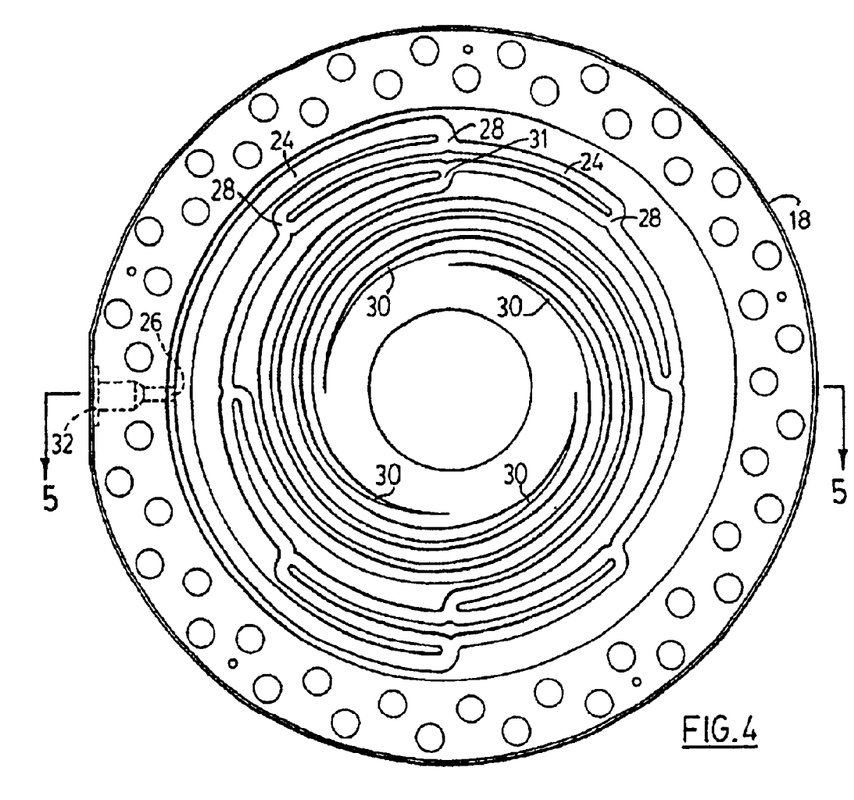
FIG. 4 is a bottom plan view of a melt distribution block according to the present invention.
Figure 5:
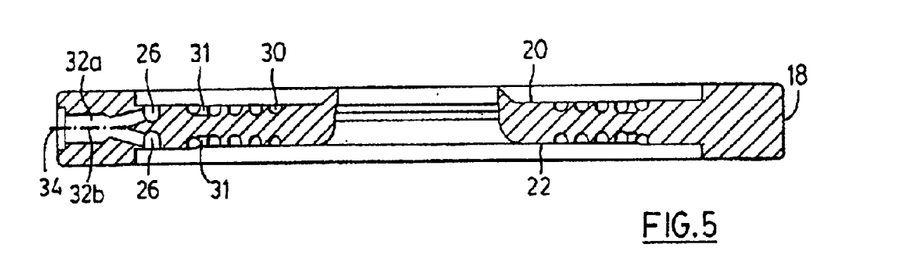
FIG. 5 is a section on line 5—5 of FIG. 4.

As can be seen in FIGS. 3, 4 and 5, an inlet port 32 extends into the outer face 18 of the melt distribution block 10 and fluidly communicates within the inlets 26 of the flow divider channels 24. As illustrated, the inlet port 32 feeds the inlets 26 on the front face 20 and rear face 22 of the melt distribution block 10. Alternatively, as suggested by dashed line 34 in FIG. 5, the inlet port 32 may be divided into separate ports, 32a and 32b respectively, to feed different types of melt to the front and rear faces 20 and 22 respectively.

Figure 6:
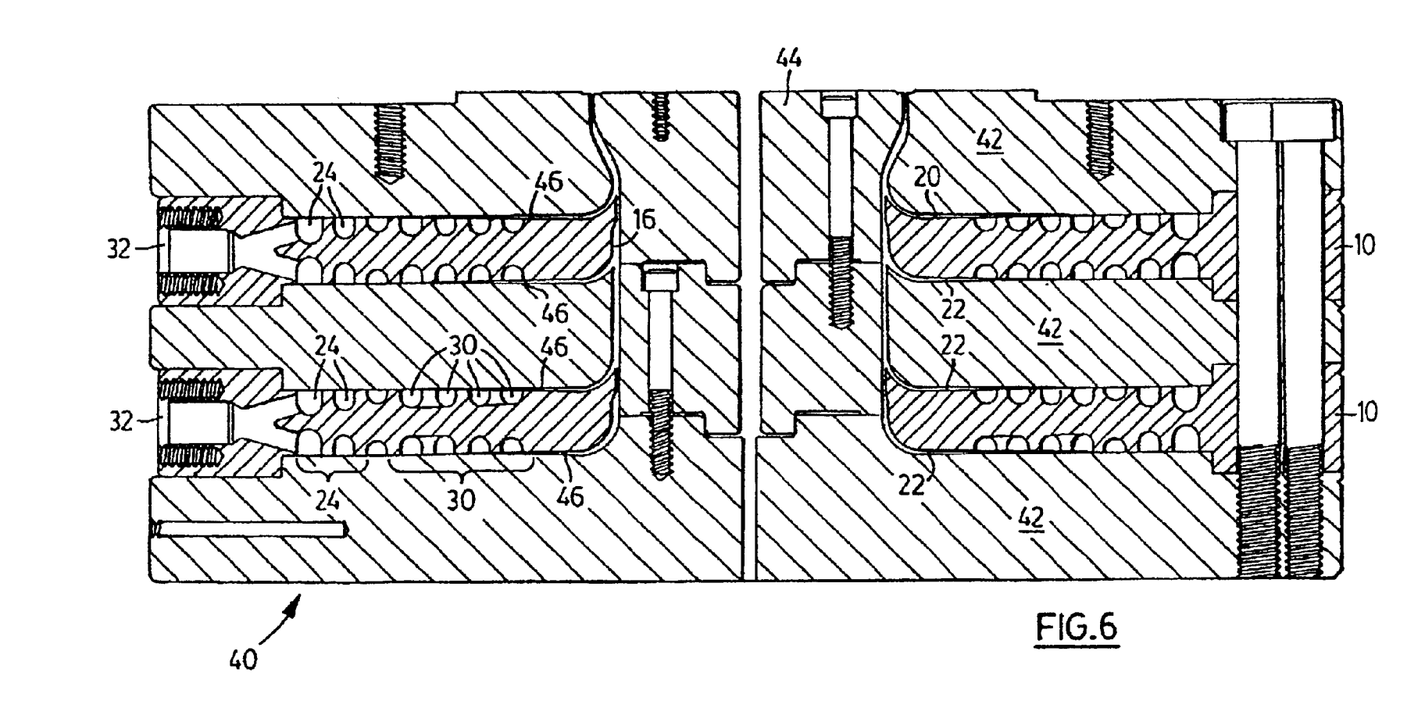
FIG. 6 is an axial section through a melt distribution die according to the present invention.

A melt distribution die according to another aspect of the present invention is generally indicated by reference 40 in FIG. 6. A segment of a melt distribution die 40 is shown in larger scale in FIG. 7. The melt distribution die 40 includes an axially stacked array of melt distribution blocks 10 as described above interspersed with separator blocks 42, extending about a central mandrel 44. The extrusion passage 16 is defined between the separator blocks 42, melt distribution blocks 10 and the central mandrel 44.

Figure 7:
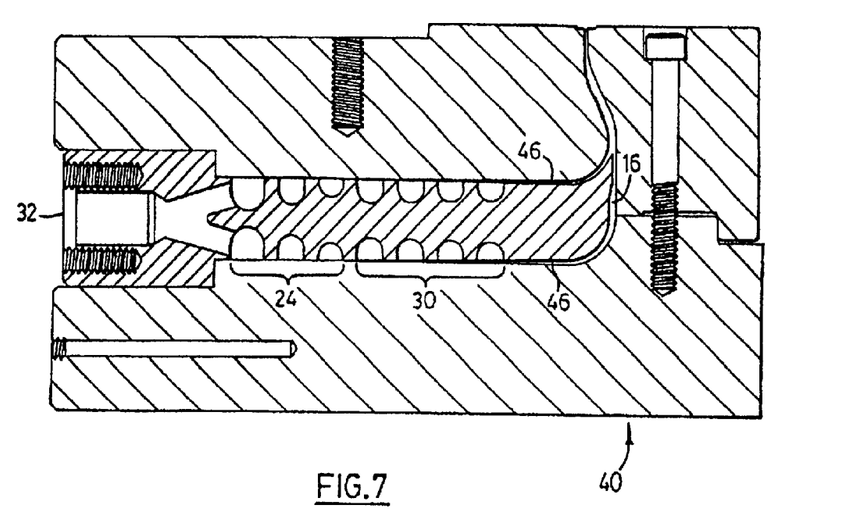
FIG. 7 is an axial sectional view illustrating one half of a melt distribution block according to the present invention mounted between two separator blocks; and, FIG. 8 is an axial section through a melt distribution die according to an alternate embodiment of the present invention.

The flow divider channels 24 are completely covered by the separator blocks 42 in FIGS. 6 and 7. The feed spirals 30 are not completely covered by virtue of a space between the separator blocks 42 and the front and rear faces 20 and 22 respectively adjacent the feed spirals 30 to define a melt outlet passage 46 extending into the extrusion passage 16. Melt will therefore overflow the edges of the feed spirals 30 to form a film of melt which is continuous about the circumference of the melt distribution block 10 at least leading into the extrusion passage 16.

In the arrangement illustrated, the front face 20 tapers toward the rear face 22 adjacent the feed spirals 30 to provide the space for the melt outlet passage 46. Alternatively, the front face 20 and rear face 22 may be substantially parallel across the melt block 10 and the space for the melt outlet passage 46 may be accommodated by relieving the corresponding faces of the separator blocks 42.

Although two melt distribution blocks 10 are illustrated in the stacked array of the melt distribution die 40, it will be appreciated by those skilled in such structures that more or less melt distribution blocks may be accommodated depending on the number of layers required to be co-extruded.

Creating multi-layer films requires processing different materials and different layers. This means that dissimilar materials are processed at different temperatures. While not always the case, some materials can be damaged or degraded if they are exposed to temperatures above their respective optimal processing temperatures. When a temperature degradeable material in a co-extrusion die is placed adjacent a material that is processed at a higher temperature, as is often the case, the hotter processing material will transfer thermal energy to the heat sensitive material. This will tend to raise the temperature of the heat sensitive material and potentially cause its degradation.

Figure 8:
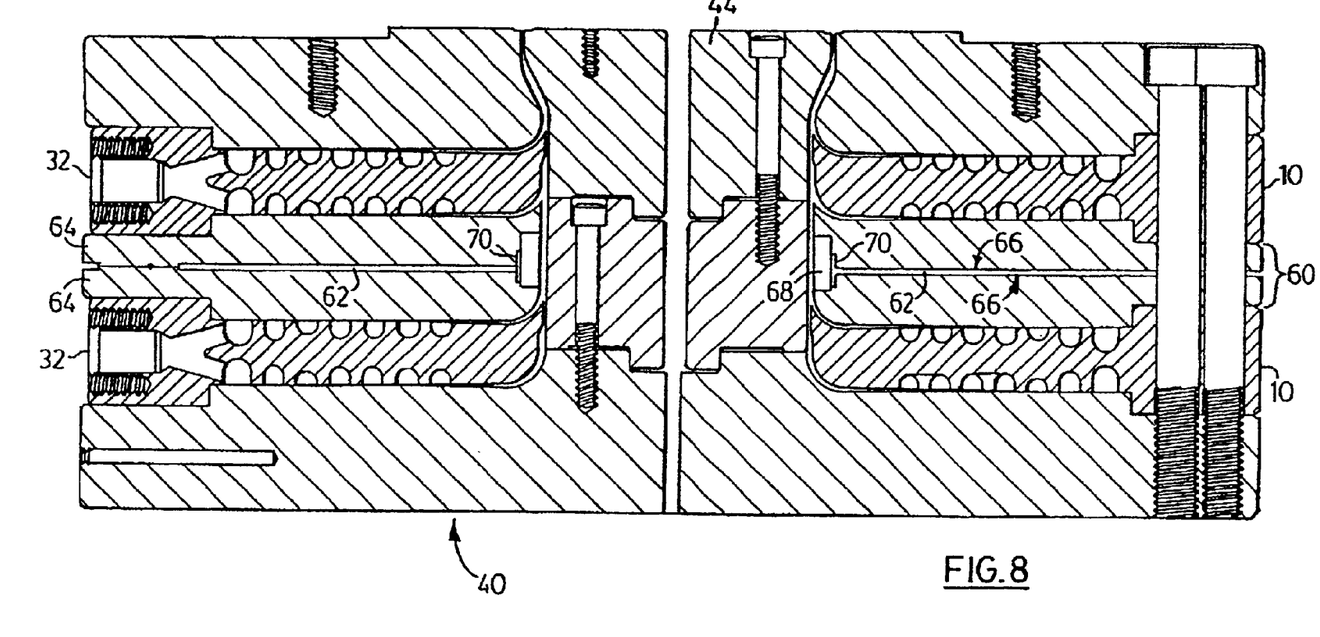

According to a preferred embodiment of the present invention, the temperature transfer problem may be addressed by adding an insulation layer between adjacent melt distribution blocks 10 to inhibit thermal energy transferred between layers. FIG. 8 illustrates one manner in which adjacent melt distribution blocks 10 may be thermally isolated. In the FIG. 8 embodiment, one of the separator blocks, indicated by reference 60, includes an insulating zone 62. According to this embodiment, the insulating zone 62 may be a gap between adjacent faces 66 of adjacent parts 64 of the separator block 60. The gap 62 may be formed by machining at least one of the adjacent faces 66 of the parts 64 of the separator so as to form a recess extending into the face(s). In FIG. 8, corresponding recesses extend into each adjacent face. It will be appreciated however that only one of the faces 66 need be provided with a recess to form the gap comprising the insulating zone 62.

In the FIG. 8 embodiment, a spacer 68 is provided between the parts 64 of the spacer block 60 adjacent the mandrill 44 to provide support and maintain the parts 64 in a spaced apart relationship. The gap which comprises the insulating zone 62 may extend between the parts 64 and a radially outward face 70 of the spacer 68. The spacer 68 may be of a metal, but preferably one with a lower thermal conductivity than that of the separator block 60.

Other approaches to thermal isolation may be used as alternative or in addition to the use of a gap for the insulation zone 62. For example, a ceramic insulator may be used between the parts 64 either within or in lieu of the gap.

The above description is intended in an illustrative rather than a restrictive sense. Variations to the exact structures described may be apparent to those skilled in coextrusion dies without departing from the spirit and scope of the present invention as defined by the claims set out below.

Figure 9:
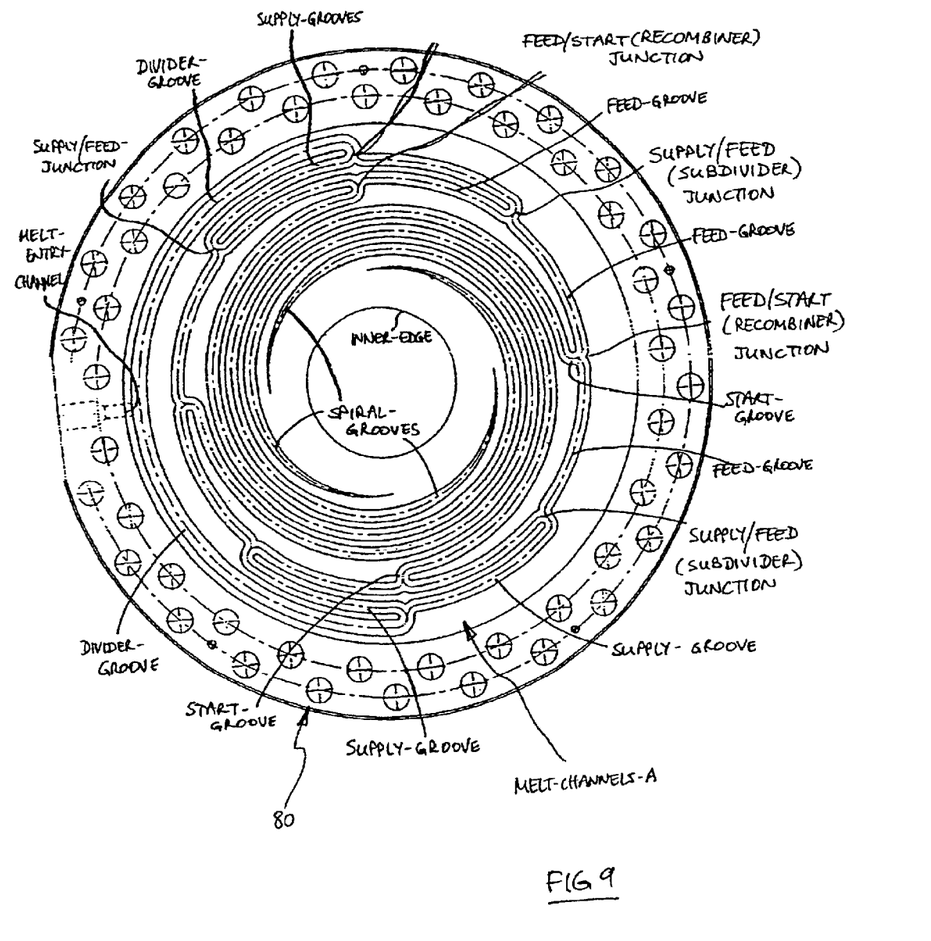
FIG. 9 is a view of a groove-face similar to that shown in FIG. 1.

FIG. 9 is a plan view of a die-member 80. Groove-face-A is shown, having melt-conveying-channels-A. Groove-face-B lies on the opposite side of the die-member, i.e on the underside of the die-member in the view of FIG. 9. The groove-face-B has melt-conveying-channels-B, which lie exactly underneath the melt-conveying-channels-A. This is to say, even if the die-member 80 were made of glass, the melt-conveying-channels-B would not be visible in the FIG. 9 view, because they lie underneath the melt-conveying-channels-A.

The melt-conveying-channels-A in FIG. 9 include: one entry-channel; two divider-grooves; four supply-grooves; eight feed-grooves; four start-grooves; and four spiral-grooves.

Figure 10:
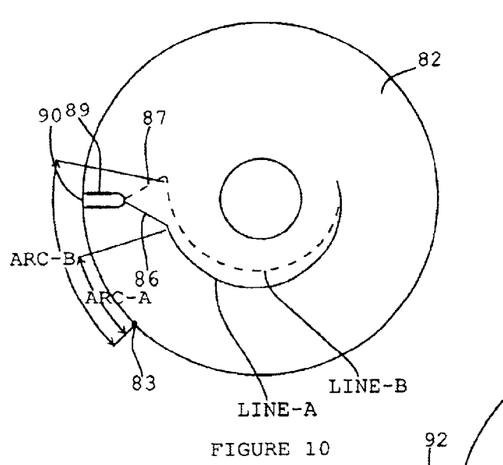
FIG. 10 is a diagrammatic view showing another grooves layout.

FIG. 10 shows a similar plan view of another die-member 82. Here, the whole set of melt-conveying-grooves-A as in FIG. 9 is shown diagrammatically, in that the set shown in FIG. 9 is represented by the line-A. In FIG. 10, underneath the die-member 82, melt-conveying-grooves-B are represented by the line-B.

In FIG. 10, the melt-conveying-grooves-A are staggered, i.e circumferentially or orientationally offset, with respect to the melt-conveying-grooves-B. The line-A is spaced, in the circumferential or orientational sense, an arc-A relative to a datum-point 83 on the outer-face 84 of the die-member 82. The line-B lies spaced at a arc-B relative to the datum-point 83, which is different from arc-A.

When arc-A and arc-B are almost the same (FIG. 10), the designer may find it convenient to arrange for both sets of melt-conveying-grooves-A and -B to be fed from a single point. So, in this case, melt-entry-channel-A 86 and melt-entry channel-B 87 both open into a unitary melt-entry-port 89. A pipe-connector 90 enables the port 89 to be connected to a source of hot pressurised melt.

When arc-A and arcB differ greatly (FIG. 11), preferably the melt-entry-port is in two sections, having separate pipe-connectors 92,93. In this case, the melt-entry-channel-A 94 is not in communication with the melt-entry-channel-B 95. The two separate pipe-connectors 92,93 may be connected, either both to the same source, or to two separate sources— which is appropriate, for example, if different melts are being fed respectively to the two sets of grooves.

In FIG. 9, the spiral-grooves-A have an anti-clockwise spiral sense, when the die-member is viewed face-on to the groove-face-A. In FIG. 9, spiral-grooves-B lie exactly underneath, and are therefore hidden by, the spiral-grooves-A, whereby the spiral-grooves-B also have an anti-clockwise spiral sense, when viewed face-on to groove-face-A. (Of course, spiral-grooves-B, in that case, have a clockwise spiral-sense when viewed face-on to groove-face-B.)

(It may be noted that in FIGS. 1,2 above (and in FIGS. 3,4), if the die-member there were made of glass, the grooves in the upper face would appear not to be in an overlying, and therefore invisible, relationship with the grooves in the lower face, but rather the grooves in the lower-face would be visible, criss-crossing underneath the grooves in the upper face.)

Figure 11:
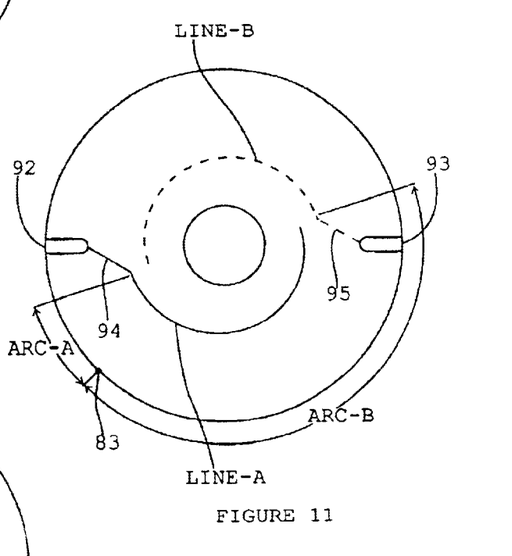
FIG. 11 is a diagrammatic view showing a further grooves layout.
Figure 12:
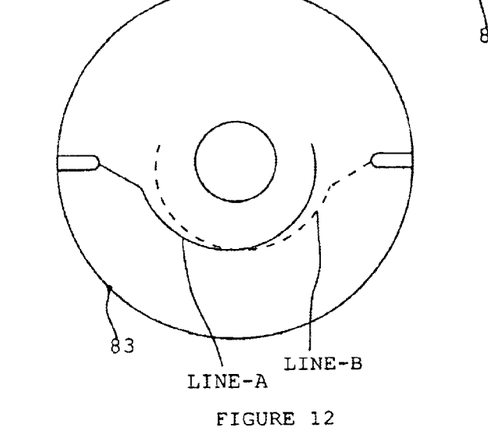
FIG. 12 is a diagrammatic view showing yet another grooves layout.

In FIGS. 10,11 the grooves-A and the grooves-B both go clockwise, but they do not overlie. In FIG. 12, the grooves-A lie in the opposite spiral-sense from the grooves-B, and the grooves-A also are circumferentially offset from the grooves-B.

The configuration in which grooves-A lie exactly over grooves-B, as in FIG. 9, in less preferred by the designer, because of the possibility that some slight unevenness on one face might be repeated in the other face, and thus perhaps cause banding to appear in the resulting plastic film. Some manner of staggering, or de-equalising, the upper and lower grooves is preferred, and the configurations of FIGS. 10,11,12 show alternatives to that of FIGS. 1,2.

It is not essential that the melt-conveying-grooves-B underneath the die-member be identical to the melt-conveying-grooves-A on top. For example, the number M of spiral-grooves-B below need not be the same as the number N of spiral-grooves-A above.

It is easier to ensure that the melt is divided evenly between the spiral-grooves if the number of spiral-grooves is a multiple of two, since then each junction is a single T- or Y-junction. But, if the designer is bound to avoid the restriction to a multiple of two, an incoming-melt channel can be split into, say, three streams, rather than two, with careful engineering.

Figure 13:
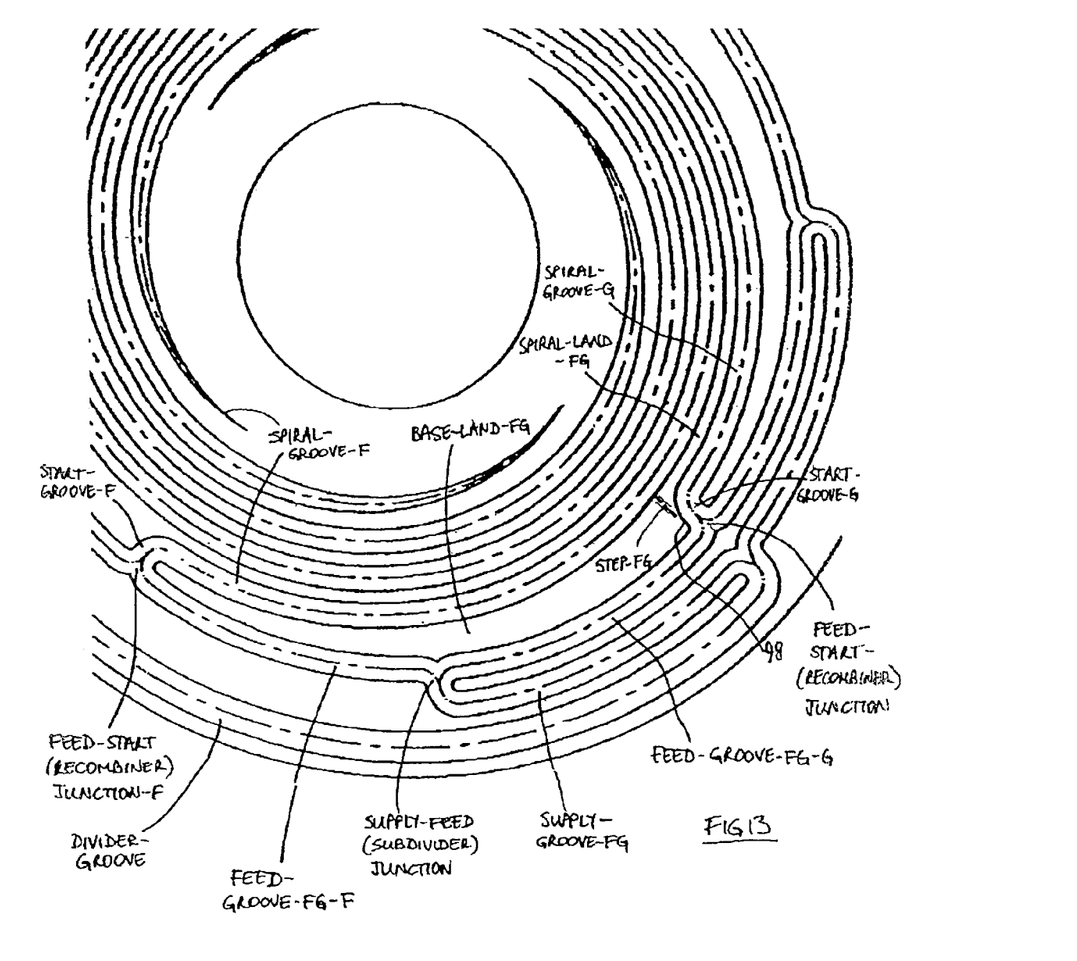
FIG. 13 is a close-up of a portion of FIG. 9.

FIG. 13 illustrates a measure that is aimed at ensuring evenness in the flow of melt to all the spiral-grooves. FIG. 13 concerns the lands between the melt-conveying-grooves, and especially between the spiral-grooves. Two adjacent spiral-grooves, F and G, are shown. Spiral-land-FG is the land lying between spiral-groove-F and spiral-groove G. The spiral-grooves-F and -G receive melt from start-groove-F and start-groove-G respectively. Base-land-FG is the land lying between start-groove-F on the left, start-groove-G on the right, spiral-groove-F to the inside, and feed-groove-FG-F and feed-groove-FG-G to the outside. (Feed-groove-FG-F and feed-groove-FG-G both receive melt from supply-groove-FG, as shown.) More precisely, the base-land-FG is bounded by the edges of the said grooves.

The groove-face of the illustrated die-member in FIG. 13 is overlain by a smooth flat surface, for example by the smooth flat undersurface of another die-member stacked above the illustrated die-member. The spiral-land-FG is machined to lie well clear of this overlying surface; for example, the spiral-land-FG typically is a millimeter, or more, clear of the overlying surface. Thus, melt in the spiral-grooves spills over the edges of the spiral-grooves, as the melt passes inwards, towards the inner-edge of the illustrated groove-face.

It is recognised that, preferably, the melt should not be allowed to spill over in the region of the base-land-FG. The base-land-FG should be clamped tightly against the said overlying surface: that is to say, the base-land-FG should not be clear of the overlying surface, such that melt from the feed-grooves-FG-F and -FG-G could spill over the base-land-FG, into the spiral-groove-F.

The function of the spiral-grooves is to ensure that the melt flows as evenly as possible over the inner-edge of the annular groove-face, i.e that the flow over the inner-edge is the same at every point on the circumference of the inner-edge. This evenness-function might be compromised if the melt were allowed to flow over the base-land-FG (and, where there are four spiral-grooves, the corresponding three other base-lands), since the comparatively large area of the base-land would make it difficult to enhance that all the base-lands between the spiral-grooves allowed exactly equal amounts of melt to pass. By keeping the base-lands tight against the overlying surface, no melt can pass over any of the base-lands, whereby that source of possible unevenness is eliminated.

Evenness of melt flow over the inner-edge is very important to the quality of the finished plastic film, and designers of blown-film extrusion dies strive to ensure that the melt passing into and through the spiral grooves is the same for all the spiral-grooves.

Thus, the spiral-land-FG is machined away, and lies well below the level of the base-land-FG. This difference preferably is accommodated by providing a step-FG. The step-FG preferably is at least approximately contiguous with, and in line with, the left edge 98 of the start-groove-G. The step-FG, like the rest of the melt-conveying-channels of the die, should be profiled to avoid impeding the flow of melt, and especially to avoid even tiny pockets that might cause melt to slow down and hang up.

There are several kinds of channels or grooves included in the melt-conveying-channels-A as shown in FIG. 9. On entering the die-member, the melt passes first through the flow-divider-grooves, where the incoming flow from the melt-entry-port is divided among four supply-grooves, into four separate streams. It might be considered that these four streams may be fed straight into the four spiral-grooves. However, it is recognised that this direct connection should be avoided. Liquid polythene, and many other plastics from which blown-film is made, have the unfortunate property that the viscosity of the liquid is very temperature-dependent. Even a slight cooling of the liquid causes a large increase in viscosity. In a melt-conveying-channel, the faster-moving liquid in the middle of the channel tends to be the less viscous liquid, i.e tends to be the hotter liquid, than the slow liquid adjacent to the walls of the channel. Thus, the cooler portions of the liquid flowing in the channels tend to migrate to the walls of the channels, the hotter portions to the centres. As a result, the channel can serve, indeed, almost as a temperature separator, separating the hot stream in the centre of the channel from the surrounding cooler stream on the walls.

Attention is directed to patent application U.S. Pat. No. 5,261,805 (Gates, November 1993). This patent shows the use of flow-mixing-channels to a centre-fed cylindrical die. Now, it is recognised that flow-mixing-grooves can be provided in an annular flat die, of the kind as shown herein, which is fed from a single melt-entry-port on the outer-face thereof. In the flow-mixing-grooves, the melt is subdivided and recombined, as it flows inwards towards the inner-edge of the die, and this can serve to even out some temperature differences.

The flow-mixing-grooves are interposed between the four supply-grooves and the four spiral-grooves, whereby the grooves convey melt from the melt-entry-port in the outer-face inwards first through the flow-divider channels to the supply-grooves, then inwards through the flow-mixing-channels-A, then inwards through the spiral-grooves-A, and finally inwards towards the inner-edge-A of the groove-face-A.

As shown in FIG. 9, the flow-mixing-channels include subdivider-junctions and recombiner-junctions. At the subdivider-junctions, the four incoming-streams from the flow-divider-channels are sub-divided into respective left and right subdivided-streams. The recombiner-junctions lie inwards of the subdivider-junctions, and between adjacent subdivider-junctions, in the sense of being positioned to receive the subdivided streams moving inwards from the adjacent subdivider-junctions.

Each recombiner-junction receives the left subdivided-stream from the adjacent one of the subdivider-junctions to the right of that recombiner-junction, and receives the right subdivided-stream from the adjacent one of the subdivider-junctions to the left of that recombiner-junction. The recombiner-junction combines the said left and right subdivided-streams into one recombined-stream respective to that recombiner-junction.

By this arrangement, the streams from the supply-grooves are split, the hot centre portions thereof going to one wall of the feed-grooves, and the cold outer portions going to the other wall of the feed-grooves. When the portions recombine, in the start-grooves, the cold portions now lie to the inside, and the hot portions to the outside, of the start-grooves. As a result, the melt in the start-grooves, and hence in the spiral-grooves, tends to have a more even temperature profile that the melt in the supply-grooves.

The die-members shown in the previous drawings are flat. Alternatively, the melt-conveying-grooves may be provided on a convex conical surface, in the manner as illustrated, for example, in patent publication U.S. Pat. No. 5,779,959 (Tuetsch, July 1998). Conical die-members may be provided in a stack, and the concave conical surface of one die-member serves as the overlying surface for the melt-conveying-grooves provided in the next die-member below, in the stack.

Many of the aspects of groove layout as described herein can be applied to conical dies. However, it can be difficult to machine grooves in a concave (i.e inwards-facing) surface, and therefore providing grooves only on the convex side of the die-member is preferred, when the die member is conical.

What is claimed is:

1. Extrusion die apparatus, for manufacturing blown plastic film, wherein: the apparatus includes a die-member; the die-member is of generally annular form, having a circumferentially-disposed outer-face and inner-face; the die-member has a groove-face-A, which is of annular configuration, and which has an inner-edge-A; the groove-face-A is formed with melt-conveying-channels-A; the die-member includes a melt-entry-port, which is located in the outer-face of the die-member; the apparatus includes an annular groove-opposing-surface-A; the melt-conveyingchannels-A include N spiral-grooves-A, which are open, and are formed into the groove-face-A; the apparatus is so arranged that melt, in flowing towards the inner-edge-A, spills over lands between turns of the spiral-grooves-A; the melt-conveying-channels-A are arranged, in relation to the groove-opposing-surface-A, for conveying liquid melt under pressure from the melt-entry-port in the outer-face, in a progressively inwards sense, through the spiral-grooves-A, to the inner-edge-A of the groove-face-A; the melt-conveying-channels-A include at least N supply-channels-A; the melt-conveying-channels-A include flow-divider-channels-A, which receive melt from the melt-entry-port, and divide the same into at least N incoming-streams, and convey the incoming-streams one each into the supply-channels-A respectively, the melt-conveying-channels-A include flow-mixing-channels-A; the flow-mixing-channels-A include subdivider-junctions-A and recombiner-junctions-A; at the subdivider-junctions-A, respective ones of the at least N incoming-streams from the supply-channels-A are sub-divided into respective left and right subdivided-streams; the recombiner-junctions are positioned inwards of the subdivider-junctions, and between adjacent subdivider-junctions, in the sense of being positioned to receive the subdivided-streams moving inwards from the adjacent subdivider-junctions, the melt-conveying-channels are so configured that, in respect of each one of the recombiner-junctions, the recombiner-junction receives the left subdivided-stream from the adjacent one of the subdivider-junctions to the right of that recombiner-junction, and receives the right subdivided-stream from the adjacent one of the subdivider-junctions to the left of that recombiner-junction, and combines that said left and right subdivided-streams into one recombined-stream respective to that recombiner-junction; the melt-conveying-channels-A include N of the recombiner-junctions, and the arrangement of the melt-conveying-channels is such that the N recombined-streams flow inwards, one each respectively, to the N spiral-grooves-A; and the melt-conveying-channels-A are so arranged as to convey melt from the melt-entry-port in the outer-face inwards first through the flow-divider-channels, then inwards through the supply-channels-A, then inwards through the flow-mixing-channels-A, then inwards through the spiral-grooves-A, then inwards towards the inner-edge-A of the groove-face-A;

wherein the annular die-member has grooves both sides, in that: the die-member also has a groove-face-B, on the opposite thereof from groove-face-A; the groove-face-B is of annular configuration, and has an inner-edge-B; the groove-face-B is formed with melt-conveying-channels-B; the melt-conveying-channels-B include M spiral-grooves-B, which are open, and are formed into the groove-face-B; the melt-conveying-channels-B are arranged for conveying liquid melt under pressure from the melt-entry-port in the outer-face, in a progressively inwards sense, through the spiral-grooves-B, to the inner-edge-B of the groove-face-B; the melt-conveying-channels-A include at least M supply-channels-A; the melt-conveying-channels-B include flow-divider-channels-B, which receive melt from the melt-entry-port, and divide the same into at least M incoming-streams, and convey the incoming-streams one each into the supply-channels-A respectively; the melt-conveying-channels-B include flow-mixing-channels-B; the flow-mixing-channels-B include subdivider-junctions-B and recombiner-junctions-B; at the subdivider-junctions-B, respective ones of the at least M incoming-streams from the flow-divider-channels-B are subdivided into respective left and right subdivided-streams; the recombiner-junctions are positioned inwards of the subdivider-junctions, and between adjacent subdivider-junctions, in the sense of being positioned to receive the subdivided-streams moving inwards from the adjacent subdivider-junctions; the melt-conveying-channels are so configured that, in respect of each one of the recombiner-junctions, the recombiner-junction receives the left subdivided-stream from the adjacent one of the subdivider-junctions to the right of that recombiner-junctions, and receives the right subdivided-stream from the adjacent one of the subdivider-junctions to the left of that recombiner-junction, and combines the said left and right subdivided-streams into one recombined-stream respective to that recombiner-junction; the melt-conveying-channels-B include M of the recombiner-junctions, and the arrangement of the melt-conveying-channels is such that the M recombined-streams flow inwards, one each respectively, to the M spiral-grooves-B; and the melt-conveying-channels-B are so arranged as to convey melt from the melt-entry-port in the outer-face inwards first through the flow-divider-channels, then inwards through the supply-channels-B, then inwards through the flow-mixing-channels-B, then inwards through the spiral-grooves-B, then inwards towards the inner-edge-B of the groove-face-B;

wherein the N spiral-grooves-A have a spiral-sense that is clockwise when viewed from one side of the annular die-member; the M spiral-grooves-B have a spiral-sense that is also clockwise, when viewed from that same one side of the die-member.

2. Apparatus of claim 1, wherein N=a number in the series 2,4,8,16.

3. Apparatus of claim 2, wherein N=4.

4. Apparatus of claim 1, wherein the groove-opposing-surface-A is a smooth flat plane, the groove-face-A being correspondingly flat.

5. Apparatus of claim 1, wherein the groove-opposing-surface-A is a concave frustum of a right cone, the groove-face-A being correspondingly convexly conical.

6. Apparatus of claim 1, wherein the flow-divider-channels-A and the flow-mixing-channels-A comprise open grooves, which are formed into the groove-face-A.

7. Apparatus of claim 1, wherein the arrangement of the apparatus is such that the spiral-grooves receive liquid-melt that has passed from the melt-entry-port along respective pathways within the melt-conveying-channels-A; the respective pathways are of equal length, and of equal number of divisions and confluences, and of equal tortuousnesses.

8. Apparatus of claim 1, wherein: the N spiral-grooves-A include spiral-groove-F and spiral-groove-G, spiral-groove-G being the next-adjacent spiral-groove to the right of spiral-groove-F; start-groove-F is the respective start-channel-A to spiral-groove-F; start-groove-G is the respective start-channel-A to spiral-groove-G, whereby start-groove-G lies to the right of start-groove-F; supply/feed-junction-FG is the respective supply/feed-junction located between the start-channel-F and the start-channel-G; feed-groove-FG-F is the respective feed-channel that runs leftwards from the supply/feed-junctions-FG to the start-groove-F; feed-groove-FG-G is the respective feed-channel that runs rightwards from the supply/feed-junction-FG to the start-groove-G; base-land-FG is the area bounded by and between the following grooves; spiral-groove-F; startgroove-F and start-groove-G; feed-groove-FG-F and feed-groove-FG-G; radial lines drawn on the annular groove-face-A, at a spiral-orientation relative to the datum-point, pass through both the spiral-groove-face and the spiral-groove-G, and through a spiral-land-FG there between; radial lines drawn on the annular groove-face-A, at a base-orientation relative to then datum, pass through spiral-groove-F, and do not pass through spiral-groove-G, and do pass through base-land-FG; the spiral-land-FG of such height as to be clear of groove-opposing-surface-A, and to be so clear thereof that melt leaks and spills over the spiral-land-FG, out of spiral-groove-G, and inwards towards the inner-edge-A of the die-member; the base-land-FG is of such height so to be tight against the groove-opposing-surface-A, whereby substantially no leakage or spillage of melt occurs over the base-land-FG; the groove-face-A is formed with a step-FG, and the step-FG marks the change in height between the base-land-FG and the spiral-land-FG, in that the base-land-FG lies to the left, and the spiral-land-FG lies to the right, of the step-FG.

9. Apparatus of claim 8, wherein the change in height between the base-land-FG and the spiral-land-FG, at the step-FG, is at least one millimeter.

10. Apparatus of claim 8, wherein the step-FG is located adjacent to start-groove-G, in that: the step-FG marks a first portion of a right-side-boundary of the base-land-FG; the start-groove-G has a left edge and a right edge; the edges of the start-groove-G lie approximately radially with respect to the annular groove-face-A; the left edge of start-groove-G marks a second portion of the right-side-boundary of the base-land-FG; the said first portion of the right-side-boundary of the base-land-FG is at least approximately continuous with the said second portion.

11. Apparatus of claim 10, wherein the step-FG follows a line that lies, at least approximately, on a radius of the annular groove-face-A.

12. Apparatus of claim 1, wherein: the melt-conveying-channels-A include an entry-channel-A, which is in melt-conveying communication with, and receives melt from, the melt-entry-port; the entry-channel-A is in melt-conveying communication with N flow-divider-channels-A, which are so arranged as to split the flow from the melt-entry-port equally there between; the N flow-divider-channels are in melt-conveying communication respectively with the N supply-channels-A; the melt-conveying-channels-A are so arranged as to convey melt from the melt-entry-port to the entry-channel-A, then progressively inwards to the flow-divider-channels-A, and then inwards to the supply-channels.

13. Apparatus of claim 12, wherein: the die-member includes a melt-entry-channel-A, and the melt, in passing from the melt-entry-port in the outer-face to the melt conveying-channels-A, passes inwards through the melt-entry-channels-A; the die-member includes a melt-entry-channel-B, and the melt, in passing from the melt-entry-port in the outer-face to the melt conveying-channels-B, passes inwards through the melt-entry-channel-B; the arrangement of the apparatus is such that all melt entering the set of melt-carrying-channels-A is melt that has passed through melt-entry-channel A, and all melt entering the set of melt-conveying-channels-B is melt that has passed through melt-entry-channel-B; the die-member includes a channel/groove-junction-A-, at which melt from the melt-entry-channel-A transfers into the set of melt conveying-channels-A; the die-member includes a channel/groove-junction-B, at which melt from the melt-entry-channel-B transfers into the set of melt conveying-channels-B; with respect to a datum-point on the outer-face of the die-member, channel/groove-junction-A lies oriented at an orientation-angle-A thereto, and channel/groove-junction-B lies oriented at an orientation-angle-B thereto; and the channel/groove-junction-A is staggered, circumferentially, with respect to channel/groove-junction-B, in that orientation-angle A is different from orientation-angle-B.

14. Apparatus of claim 13, wherein the melt-conveying-channels-A are correspondingly offset circumferentially, relative to the datum-point, from the melt-conveying-channels-B.

15. Apparatus of claim 13, wherein: the melt-entry-port includes one pipe-connector, whereby the melt-entry-port can be connected by a pipe to a source of pressurized hot melt; and both melt-entry-channel-A and melt-entry-channel-B are in melt-conveying communication with the one pipe-connector.

16. Apparatus of claim 13, wherein: the melt-entry-port includes pipe-connector-A and pipe-connector B, whereby the melt-entry-port can be connected by pipes to sources of pressurized hot melt; pipe-connector-A and pipe-connector-B are separate from each other, within the die-member, melt-entry-channel-A is in melt-conveying communication with pipe-connector-A; and melt-entry-channel-B is melt-conveying communication with pipe-connector-B.

17. Extrusion die apparatus, for manufacturing blown plastic film, wherein: the apparatus includes a die-member, the die-member is of generally annular form, having a circumferentially-disposed outer-face and inner-face; the die-member has opposing side faces, comprising annular groove-face-A and annular groove-face-B, respectively; groove-face-A meets the inner-face at inner-edge-A, and groove-face-B meets the inner-face at inner-edge B; groove-face-A is formed with a set of melt-conveying-channels-A, and groove-face-B is formed with a set of melt-conveying-channels-B; the die-member includes a melt-entry-port, which is located in the circumferential outer-face of the die-member; the arrangement of the melt-conveying-channels-A is such that liquid melt passes under pressure from the melt-entry-port, inwards through the set of melt-conveying-channels-A, and inwards to, and over, the inner-edge-A; the arrangement of the melt-conveying-channel B is such that liquid melt passes under pressure from the melt-entry-port, inwards through the set of melt-conveying-channels-B, and inwards to, and over, the-inner-edge-B; the die-member includes a melt-entry-channel-A, and the melt, in passing from the melt-entry-port in the outer-face to the set of melt-conveying-channels-A, passes inwards through the melt-entry-channel-A; the die-member includes a melt-entry-channel-B, and the melt, in passing from the melt-entry-port in the outer-face to the set of melt-conveying-channels-B, passes inwards through the melt-entry-channel-B; the arrangement of the apparatus is such that all melt entering the set of melt-conveying-channels-A is melt that has passed through melt-entry-channel-A, and all melt entering the set of melt conveying-channels-B is melt that has passed through melt-entry-channel-B; the die-member includes a channel/groove-junction-A-, at which melt from the melt-entry-channel-A transfers into the set of melt conveying-channels-A; the die-member includes a channel/groove-junction-B, at which melt from the melt-entry-channel-B transfers into the set of melt conveying-channels-B; with respect to a datum-point on the outer-face of the die-member, channel/groove-junction-A lies orientated at an orientation-angle-A thereto, and channel/groove-junction-B lies orientated at an orientation-angle-B thereto; and the channel/groove-junction-A is staggered, circumferentially, with respect to channel/groove-junction-B, in that orientation-angle-A is differed from orientation-angle-B, such that melt conveying-channels-A and melt-conveying-channels-B crisscross to de-equalize the orientation of melt conveying-channels-A relative to melt-conveying-channels-B.

18. Extrusion die apparatus, for manufacturing blown plastic film, wherein: the apparatus includes a die-member; the die-member is of generally annular form, having a circumferentially-disposed outer-face and inner-face; the die-member has opposing side faces, comprising annular groove-face-A and annular groove-face-B, respectively; groove-face-A meets the inner-face at inner-edge-A, and groove-face-B meets the inner-face at inner-edge-B; groove-face-A is formed with a set of melt-conveying-channels-A, and groove-face-B is formed with a set of melt-conveying-channels-B; the die-member includes a melt-entry-port, which is located in the circumferential outer-face of the die-member, the melt-conveying-channels-A include N spiral-grooves-A, which are open, and are formed into the groove-face-A; the apparatus is so arranged that melt, in flowing towards the inner-edge-A, spills over lands between turns of the spiral-grooves-A; the melt-conveying-channels-A are arranged for conveying liquid melt under pressure from the melt-entry-port in the outer-face, in a progressively inwards sense, through the spiral-grooves-A, to, and over, the inner-edge-A of the groove-face-A; the melt-conveying-channels-B include M spiral-grooves-B, which are open, and are formed into the groove-face-B; the apparatus is so arranged that melt, in flowing towards the inner-edge-B, spills over lands between turns of the spiral-grooves-B; the melt-conveying-channels-B are arranged for conveying liquid melt under pressure from the melt-entry-port in the outer-face, in a progressively inwards sense, through the spiral-grooves-B, to, and over, the inner-edge-B of the groove-face-B; the N spiral-grooves-A have a spiral-sense that is clockwise when viewed from one side of the annular die-member; the M spiral-grooves-B have a spiral-sense that is also clockwise, when viewed from that same one side of the die-member.

19. Extrusion die apparatus, for manufacturing blown plastic film, wherein: the apparatus includes a die-member; the die-member is of generally annular form, having a circumferential-disposed outer-face and inner-face; the die-member has opposing side faces, comprising annular groove-face-A and annular groove-face-B, respectively; groove-face-A meets the inner-face at inner-edge-A, and groove-face-B meets the inner-face at inner-edge-B; groove-face-A is formed with a set of melt-conveying-channels-A, and groove-face-B is formed with a set of melt-conveying-channels-B; the die-member includes a melt-entry-port, which is located in the circumferential outer-face of the die-member; the melt-conveying-channels-A include N spiral-grooves-A, which are open, and are formed into the groove-face-A; the apparatus is so arranged that melt, in flowing towards the inner-edge-A, spills over lands between turns of the spiral-grooves-A; the melt-conveying-channels-A are arranged for conveying liquid melt under pressure from the melt-entry-port in the outer-face, in a progressively inwards sense, through the spiral-grooves-A, to, and over, the inner-edge-A of the groove-face-A; the melt-conveying-channels-B include M spiral-grooves-B, which are open, and are formed into the groove-face-B; the apparatus is so arranged that melt, in flowing towards the inner-edge-B, spills over lands between turns of the spiral-grooves-B; the melt-conveying-channels-B are arranged for conveying liquid melt under pressure from the melt-entry-port in the outer-face, in a progressively inwards sense, through the spiral-grooves-B, to, and over, the inner-edge-B of the groove-face-B; with respect to a datum-point on the outer-face of the die-member, melt-conveying-channels-A in groove-face-A lie orientated at an orientation-angle-A thereto, and melt-conveying-channels-B in groove-face-B lie orientated at an orientation-angle-B thereto; and the groove-face-A is staggered, circumferentially, with respect to the groove-face-B, in that orientation-angle-A is different from orientation-angle-B, such that melt conveying-channels-A and melt-conveying-channels-B crisscross to de-equalize the orientation of melt conveying-channels-A relative to melt-conveying-channels-B.

* * * * *